United States Patent

[11] 3,556,044

| [72] | Inventor | Rudolph J. Egresits<br>Conshohocken, Pa. |
|---|---|---|
| [21] | Appl. No. | 816,345 |
| [22] | Filed | Apr. 15, 1969 |
| [45] | Patented | Jan. 19, 1971 |
| [73] | Assignee | Robertshaw Controls Company<br>Richmond, Va.<br>a corporation of Delaware |

[54] INDICATING MEANS
12 Claims, 8 Drawing Figs.

[52] U.S. Cl............................................. 116/70,
73/409, 116/65
[51] Int. Cl............................................. G01l 19/12
[50] Field of Search............................................. 116/65, 70,
34; 40/28; 73/146.8, 388, 409, 410, 419

[56] References Cited
UNITED STATES PATENTS

| 2,618,977 | 11/1952 | Hottenroth.................... | 73/409 |
|---|---|---|---|
| 2,761,411 | 9/1956 | Pross et al..................... | 116/34 |
| 2,770,134 | 11/1956 | Galperin........................ | 73/146.8 |
| 3,111,930 | 11/1963 | Zipper.......................... | 116/34 |
| 3,134,445 | 5/1964 | Hotchkiss..................... | 116/70X |
| 3,220,375 | 11/1965 | Gruber et al.................. | 116/70 |
| 3,224,264 | 12/1965 | Becciani et al. ............... | 116/34X |
| 3,241,514 | 3/1966 | Grimland ..................... | 116/70 |
| 3,372,501 | 3/1968 | Greene.......................... | 40/28 |

*Primary Examiner*—Louis J. Capozi
*Attorneys*—Auzville Jackson, Jr., Robert L. Marben and Candor, Candor & Tassone ABSTRACT: An indicating device comprising a housing means having a viewable end means and an expandible element disposed in the housing means, the expandible element having a fixed end and a movable end normally tending to be spaced from the viewable end means of the housing means so as to be in a nonindicating position thereof. Pneumatic means are provided for causing a pressure differential to act across the movable end of the expandible element to expand the element and cause the movable end thereof to move into the viewable end means of the housing means so as to be in an indicating position thereof.

INVENTOR.
RUDOLPH J. EGRESITS

BY

HIS ATTORNEYS

PATENTED JAN 19 1971

INVENTOR.
RUDOLPH J. EGRESITS

BY
*Cander, Cander & Tassone*

HIS ATTORNEYS

INDICATING MEANS

This invention relates to an improved indicating device and method indicating as well as to an improved pneumatic control system utilizing such indicating means or the like.

It is well known that when a pneumatically operated control system is being utilized, indicating means are provided to respectively indicate to the operator when various of the pneumatically operated means are being operated in the system, such indicating means usually being viewable indicating means rather than audible indicating means or the like.

Accordingly, one feature of this invention is to provide improved indicating means of the above type.

In particular, one embodiment of this invention provides an indicating device having a housing means provided with a viewable end means. An expandable element is disposed in the housing means and has a fixed end and a movable end, the movable end of the expandable element normally tending to be spaced from the viewable end means of the housing means so as to be in a nonindicating position thereof. The indicating device is adapted to be interconnected into the pneumatically operated control system so that when a particular pneumatically operated device is being operated, means are provided for causing a pressure differential to act across the movable end of the expandable element to expand the element and cause the movable end to move into the viewable end means of the housing means so as to be in an indicating position thereof to indicate that the particular pneumatically operated means is operating properly.

Accordingly, an object of this invention is to provide an improved indicating device, the indicating device of this invention having one or more of the novel features set forth above or hereinafter shown or described.

Another object of this invention is to provide an improved pneumatically operated control system utilizing such indicating means, the control system of this invention having one or more of the novel features set forth above or hereinafter shown or described.

Another object of this invention is to provide an improved method of indicating, the method of this invention having one or more of the novel features set forth above or hereinafter shown or described.

Other objects, uses and advantages of this invention are apparent from a reading of this description which proceeds with reference to the accompanying drawings forming a part thereof and wherein.

Figure 1:
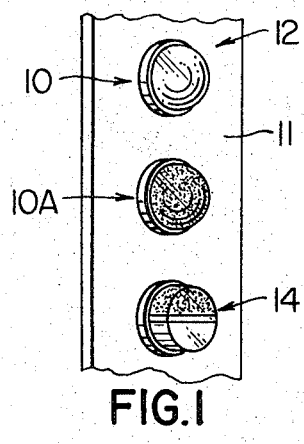
FIG. 1 is a fragmentary, perspective view illustrating a control panel containing various indicating devices of this invention.

While the various features of this invention are hereinafter described and illustrated as being particularly adapted to provide indicating means for a pneumatically operated control system, it is to be understood that the various features of this invention can be utilized singly or in any combination thereof to provide indicating means for other types of systems as desired.

Therefore, this invention is not to be limited to only the embodiments illustrated in the drawings, because the drawings are merely utilized to illustrate one of the wide variety of uses of this invention.

Figure 2:
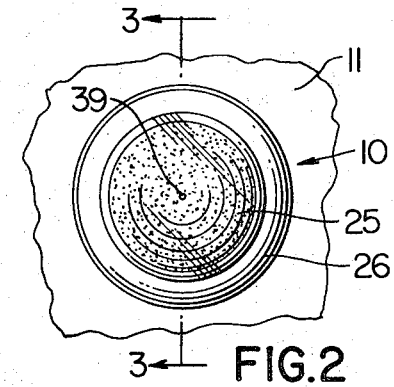
FIG. 2 is an enlarged, fragmentary, front view of one of the indicating means of FIG. 1.
Figure 3:
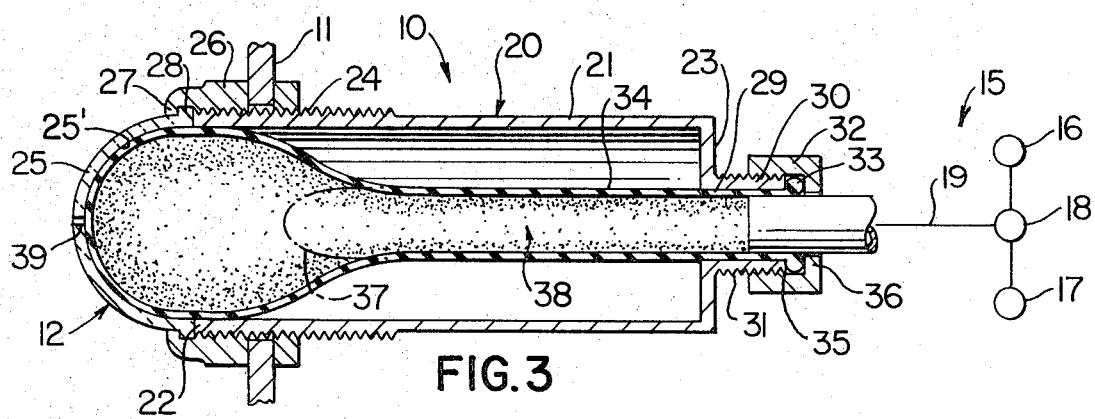
FIG. 3 is a fragmentary, cross-sectional view taken on line 3–3 of FIG. 2 and illustrates an indicating device of this invention as utilized in a pneumatically operated control system of this invention.

Referring now to FIGS. 1, 2 and 3, an improved indicating device of this invention is generally indicated by the reference numeral 10 and is carried by a control panel 11 so that a viewable end means 12 thereof can be readily viewed by an operator in a manner hereinafter described, the control panel 11 containing two like indicating devices 10 and 10A as well as another indicating device 14 of this invention later to be described. As illustrated in FIG. 1, the indicating device 10 is indicating a nonoperating condition whereas the indicating device 10A is indicating an operating condition as will be apparent hereinafter.

The indicating device 10 as illustrated in FIG. 3 is utilized in a pneumatically operated control system of this invention that is generally indicated by the reference numeral 15 and comprising a pneumatic pressure source 16, a pneumatically operated device 17 and a control means 18 for interconnecting and disconnecting the pneumatic source 16 to and from the pneumatically operated device 17.

The control means 18 is so constructed and arranged that when the same interconnects the pneumatic pressure source 16 to the control device 17 to operate the control device 17, the control means 18 simultaneously interconnects the pneumatic source 16 through a conduit means 19 to the indicating device 10 of this invention so that the indicating device 10 will visually indicate that the pneumatic source 16 is being interconnected to the pneumatically operated device 17 and is operating the same. However, when the control means 18 disconnects the pneumatic source 16 from the pneumatically operated device 17, the control means 18, in a conventional manner, simultaneously interconnects the pneumatically operated device 17 and the conduit 19 leading to the control device 10 to the atmosphere so that not only is the pneumatically operated device 17 deactuated, but also the indicating device 10 of this invention will give a clear indication that the pneumatically operated device 17 is in a deactuated condition thereof.

As illustrated in FIG. 3, the control device 10 comprises a housing means 20 defined by a substantially tubular member 21 having an open end 22 and a closed end 23, the open end 22 being externally threaded at 24 and being closed by a substantially hemispherically-shaped transparent lens 25 secured to the open end 22 of the tubular member 21 by an internally threaded retainer 26 threaded on the threaded end 22 of the tubular member 21 and having a flange 27 cooperating with an annular flange 28 on the lens 25 to hold the lens 25 to the tubular member 21. The lens 25 provides the viewable end means 12 of the device 10.

The closed end 23 of the tubular member 21 has an opening 29 passing centrally therethrough and is surrounded by a tubular extension 30 that is externally threaded at 31 to threadedly receive a retainer 32 that is adapted to sealingly compress a beaded end 33 of an expandable tubular member 34 between the end 35 of the tubular extension 30 and a flange 36 of the retainer 32 so as to fix the end 33 of the expandable element 34 in the housing means 20.

The expandable element 34 has a natural tendency to have its closed and movable end 37 disposed in the position provided by the dash-dotted line in FIG. 3 so that the movable and closed end 37 of the expandable element 34 is normally disposed completely spaced from the viewable end means 25 of the housing means 20.

The conduit means 19 of the system 15 is adapted to be telescopically disposed in sealing relation in the fixed end 33 of the expandable element 34 in the manner illustrated in FIG. 3 so that the interior 38 of the expandable element 34 is disposed in fluid communication with the conduit 19.

As illustrated in FIG. 1, when the control means 18 is not interconnecting the pneumatic source 16 to the pneumatically operated device 17, the viewable end means 25 of the indicating device 10 fully indicates to the viewer that the expandable element 34 is not at the viewable end means 25 thereof and therefore conveys the indication that the pneumatically operated device 17 is not operating. However, when the control means 18 interconnects the pneumatic source 16 to the pneumatically operated device 17, the control means 18 is also interconnecting the pressure source 16 to the conduit 19 whereby the pressure source 16 delivers fluid pressure into the interior 38 of the expandable element 34 so that the resulting pressure differential across the movable end means 37 of the expandible element 34 causes the end means 37 to expand and move into the viewable end means 25 of the housing means 20 in the manner illustrated by full lines in FIG. 3 so as to completely fill the viewable end means 25 as illustrated, the movable end means 37 not only expanding to the left in FIG. 3, but also radially outwardly expanding as illustrated so as to be in full engagement about the entire interior hemispherical surface 25' of the lens 25 to provide the indication provided by the indicating device 10A of FIG. 1. In order to permit full expansion of the movable end 37 of the expandible element 34 in the housing means 20, an opening 39 can pass centrally through the lens 25 of the housing means 20 to permit any air being compressed by the expanding element 34 to be expelled out of the housing means 20.

Subsequently, when the control means 18 disconnects the pneumatic source 16 from the pneumatically operated device 17 to deactuate the same, the control means 18 likewise interconnects the conduit 19 to the atmosphere so that the interior 38 of the expanded element 34 can return to atmospheric conditions whereby the resulting loss of pressure differential across the movable end 37 of the expandible element 34 causes the expandible element 34 to return to the nonindicating and collapsed position illustrated by the dash-dotted line 37 of FIG. 3 so that the control device 10 will provide the nonindicating condition illustrated by the indicating device 10 in FIG. 1.

It is to be understood that the expandible element 34 can be made in various colors and be also provided with special markings as desired which will be presented at the lens 25 when the element 34 is expanded. Since the movable end 37 of the expandible element 34 is carried into direct contact with the inner surface 25' of the lens 25 when the element 34 is expanded, the angle from which the expanded end 37 of the expandible element 34 can be viewed is a full 180° when the device 10 is mounted in the flat control panel 11 as illustrated.

Also, it is to be understood that the lens 25 could have indication nomenclature, etc. provided thereon and also that the expanded element 34 could be a neutral color with the color and legend being provided through different color-coated lenses 25 as desired.

The expandible element 34 can be formed of rubber, plastic, fabric, etc. and the same is substantially leakproof since the conduit 19 is fully sealed into the fixed end 33 of the expandible element 34.

Therefore, it can be seen that the indicating device 10 of this invention provides novel and unique means for readily indicating the flow of pressure fluid to a pneumatically operated device, such as device 17 of the control system 15 of this invention.

Figure 5:
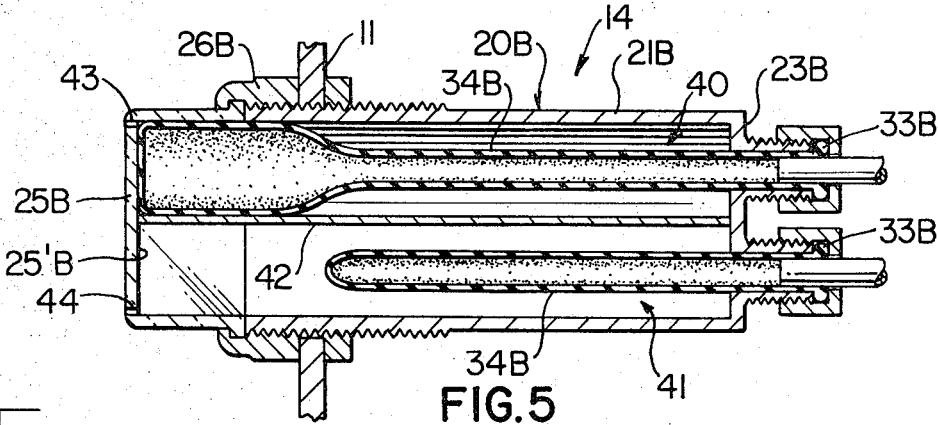
FIG. 5 is a cross-sectional view taken on line 5–5 of FIG. 4.
Figure 4:
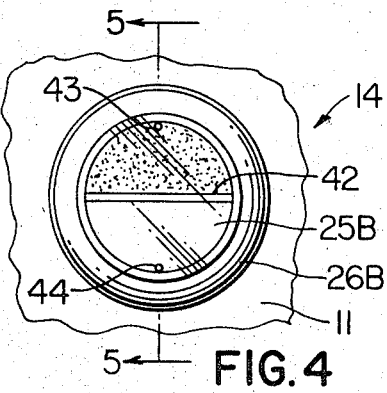
FIG. 4 is a view similar to FIG. 2 and illustrates the front view of another indicating device of FIG. 1.

The other indicating device 14 of this invention is illustrated in FIG. 1 as being mounted to the control panel 11 and is generally indicated by the reference numeral 14 in FIGS. 4 and 5, the parts of the device 14 that are similar to the indicating device 10 previously described being indicated by like reference numerals followed by the reference letter B.

As illustrated in FIGS. 4 and 5, the indicating device 14 comprises a housing means 20B secured to the control panel 11 in the manner previously described except that the housing means 20B is divided into two chambers 40 and 41 by a chamber wall 42 that extends from the closed end 23B the tubular member 21B to the interior surface 25'B of the lens 25B and the lens 25B is substantially cylindrical in configuration with two opening means 43 and 44 passing therethrough and respectively disposed in communication with the chambers 40 and 41.

Two different expandible elements 34B are respectively disposed in the chambers 40 and 41 of the housing means 20B and respectively have their ends 33B fixed to the closed end 23B of the tubular member 21B in the same manner as the element 34 of the device 10 previously described.

In this manner, the upper element 34B can provide its indicating function independently of the lower element 34B and vice versa whereby the indicating device 14 can be utilized to indicate the operation of two different pneumatically operated devices in the same manner that the indicating device 10 indicates the operation of the pneumatically operated device 17.

Figure 6:
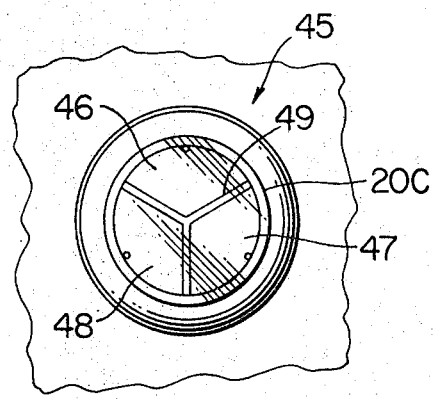
FIG. 6 is a view similar to FIG. 4 and illustrates another control device of this invention.

Further, it can readily be seen in FIG. 6 that another indicating device of this invention is generally indicated by the reference numeral 45 with parts thereof similar to the indicating device 14 being indicated by like reference numerals followed by the reference letter C. As illustrated in FIG. 6, the housing means 20C is divided into three chambers 46, 47 and 48 by an interior chamber wall means 49 with each chamber 46, 47 and 48 being adapted to receive an expandible element 34 to be operated independently of the other elements 34 so that the device 45 can provide three different indicating conditions.

Figure 7:
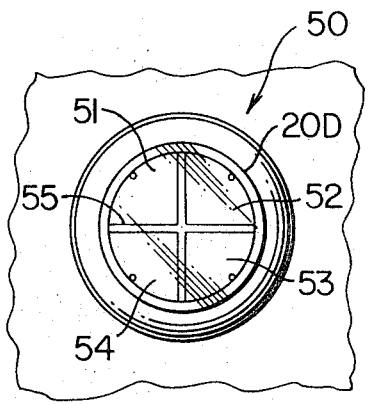
FIG. 7 is a view similar to FIG. 4 and illustrates still another control device of this invention.

Similarly, FIG. 7 provides an indicating device 50 which has parts thereof similar to the device 14 indicated by like reference numerals followed by the reference letter D.

As illustrated in FIG. 7, the housing means 20D of the indicating device 50 is divided into four separate chambers 51, 52, 53 and 54 by an interior chamber wall means 55 so that each chamber 51—54 can receive a separate expandible element 34 in the manner previously described. Thus, the indicating device 50 can provide indicating means for four different pneumatically operated devices in the manner previously described.

Accordingly, it can be seen that the various features of this invention can be modified to provide separate indicating devices for indicating the operation of one or more pneumatically operated devices, as desired.

While the various indicating devices of this invention have been previously described as being utilized with a pressure-operated control system, it is to be understood that the various features of this invention can be utilized with vacuum-operated control systems if desired.

Figure 8:
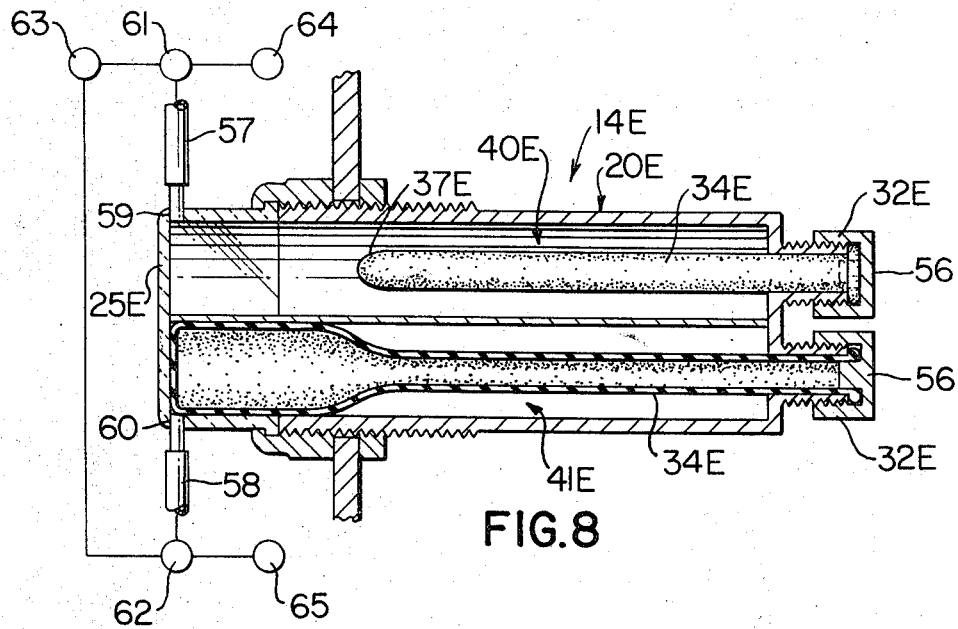
FIG. 8 is a view similar to FIG. 5 and illustrates another indicating device of this invention.

For example, reference is now made to FIG. 8 wherein another indicating device of this invention is generally indicated by the reference numeral 14E and parts thereof similar to the indicating device 14 of FIG. 5 are indicated by like reference numerals followed by the reference letter E.

As illustrated in FIG. 8, the indicating device 14E is identical to the device 14 except that the retainers 32E for each expandible element 34E have closed ends 56 completely sealing closed the expandible elements 34E. Also, conduit means 57 and 58 are respectively disposed in opening means 59 and 60 in the viewable end means 25E of the housing means 20E so as to be respectively disposed in fluid communication with the compartments 40E and 41E.

The conduits 57 and 58 are respectively controlled by control means 61 and 62 that are respectively adapted to interconnect a vacuum source 63 to vacuum-operated devices 64 and 65. Thus, when the control means 61 interconnects the vacuum source 63 to the vacuum-operated device 64, the control means 61 simultaneously interconnects the vacuum source 63 to the conduit 57 and, thus, to the chamber 40E of the indicating device 14E so that the resulting pressure differential across the movable end 37E of the expandible element 34E in the chamber 40E causes the expandible element 34E to expand toward the viewable end 25E of the indicating device 14E in the manner illustrated in cross section by the lower element 34E to indicate that the vacuum-operated device 64 is operating. Subsequently when the control means 61 disconnects the vacuum source 63 from the vacuum-operated device 64 to interconnect the device 64 to the atmosphere, the control means 61 likewise interconnects the conduit 57 to the atmosphere so that the atmosphere can return to the chamber 40E of the indicating device 14E whereby the resulting loss of pressure differential across the movable end 37E of the element 34E permits the element 34E to return to its collapsed and nonindicating position as illustrated in FIG. 8.

Similarly, the control means 62 operates in the same manner as the control means 61 except that the same controls the lower indicating device 34E in the manner previously described.

Therefore, it can be seen that the various features of this invention can operate the indicating devices with either a vacuum source or a pressure source as desired.

Thus, not only does this invention provide improved indicating means, but also this invention provides improved control systems and methods utilizing such indicating means or the like.

I claim:

1. An indicating device comprising a housing means having a viewable end means and a substantially tubular body portion leading to said viewable end means, and an expandible element disposed in said housing means and having a fixed end and a movable end with a substantially tubular body portion interconnecting together said fixed and movable ends, said movable end normally tending to be spaced from said viewable end means of said housing means so as to be in a nonindicating position thereof and said tubular body portion of said expandible element being longitudinally disposed in said tubular body portion of said housing means while being inwardly spaced therefrom throughout the length thereof, said device having means for causing a pressure differential to act across said movable end of said expandible element to longitudinally expand said element and cause said movable end to longitudinally move into said viewable end means so as to be in an indicating position thereof, said movable end of said expandible element not only longitudinally moving into said viewable end means of said housing means by said pressure differential, but also said movable end radially expanding by said pressure differential acting across said movable end to fill said viewable end means of said housing means while said body portion of said expandible element remains inwardly spaced from said body portion of said housing means throughout substantially the entire length of said body portion of said expandible element.

2. An indicating device as set forth in claim 1 wherein said viewable end means of said housing means is three dimensional so that said movable end can be viewed at an angle when in its indicating position.

3. An indicating device as set forth in claim 1 wherein said housing means has a plurality of chambers therein, said expandible element being in one of said chambers and being influenced only by said pressure differential in said one chamber, and another expandible element being disposed in another chamber and being influenced only by a pressure differential in said other chamber.

4. An indicating device as set forth in claim 1 wherein said means for causing said pressure differential to act across said movable end of said expandible element comprises passage-defining means in said housing means leading to the interior of said expandible element through the fixed end thereof.

5. An indicating device as set forth in claim 1 wherein said means for causing said pressure differential to act across said movable end of said expandible element comprises passage-defining means in said housing means leading to the exterior of said expandible element.

6. An indicating device as set forth in claim 1 wherein said expandable element comprises a flexible tubular member having a closed end defining said movable end thereof and an opposed open end defining the fixed end thereof.

7. In a pneumatic control system having a pneumatic source and pneumatically operated means controlled by said source, the improvement comprising a pneumatically operated indicating device having a housing means provided with a viewable end means and a substantially tubular body portion leading to said viewable end means, said housing means having an expandible element disposed therein, said expandible element having an end fixed to said housing means and a movable end movable relative to said housing means with a substantially tubular body portion interconnecting together said fixed and movable ends, said movable end normally tending to be spaced from said viewable end means of said housing means so as to be in a nonindicating position thereof and said tubular body portion of said expandible element being longitudinally disposed in said tubular body portion of said housing means while being inwardly spaced therefrom throughout the length thereof, and means for directing said source to said device when said source is operating said pneumatically operated means whereby a resulting pressure differential is created across said movable end of said expandible element to longitudinally expand said element and cause said movable end to longitudinally move into said viewable end means so as to indicate that said pneumatically operated means is operating, said movable end of said expandible element not only longitudinally moving into said viewable end means of said housing means by said pressure differential, but also said movable end being radially expanded by said pressure differential acting across said movable end to fill said viewable end means of said housing means while said body portion of said expandible element remains inwardly spaced from said body portion of said housing means throughout substantially the entire length of said body portion of said expandible element.

8. In a pneumatic control system as set forth in claim 7, the further improvement wherein said viewable end means is three dimensional so that said movable end can be viewed at an angle when in its indicating position.

9. In a pneumatic control system as set forth in claim 7, the further improvement wherein said housing means has a plurality of chambers therein, said expandible element being in one of said chambers and being influenced only by said pressure differential in said one chamber, and another expandible element disposed in another chamber and being influenced only by a pressure differential in said other chamber.

10. In a pneumatic control system as set forth in claim 7, the further improvement wherein said means for directing said source to said device comprises means for directing said source to the interior of said expandible element through the fixed end thereof.

11. In a pneumatic control system as set forth in claim 7, the further improvement wherein said means for directing said source to said device comprises means for directing said source adjacent the exterior of said expandible element.

12. In a pneumatic control system as set forth in claim 7, the further improvement wherein said expandible element comprises a flexible tubular member having a closed end defining said movable end thereof and an open end defining said fixed end thereof.